(12) United States Patent
Zheng et al.

(10) Patent No.: US 12,572,594 B2
(45) Date of Patent: Mar. 10, 2026

(54) METHOD AND SYSTEM FOR INCREMENTAL METAPATH STORAGE AND DYNAMIC MAINTENANCE

(71) Applicants: HUAZHONG UNIVERSITY OF SCIENCE AND TECHNOLOGY, Wuhan (CN); ZHEJIANG LAB, Hangzhou (CN)

(72) Inventors: Long Zheng, Wuhan (CN); Haiheng He, Wuhan (CN); Xiaofei Liao, Wuhan (CN); Hai Jin, Wuhan (CN); Dan Chen, Wuhan (CN); Yu Huang, Wuhan (CN)

(73) Assignees: HUAZHONG UNIVERSITY OF SCIENCE AND TECHNOLOGY, Wuhan (CN); ZHEJIANG LAB, Hangzhou (CN)

( * ) Notice: Subject to any disclaimer, the term of this patent is extended or adjusted under 35 U.S.C. 154(b) by 0 days.

(21) Appl. No.: 18/610,495

(22) Filed: Mar. 20, 2024

(65) Prior Publication Data

US 2024/0330369 A1 Oct. 3, 2024

(51) Int. Cl.
*G06F 16/901* (2019.01)
*G06F 40/30* (2020.01)

(52) U.S. Cl.
CPC .......... *G06F 16/9024* (2019.01); *G06F 40/30* (2020.01)

(58) Field of Classification Search
None
See application file for complete search history.

(56) References Cited

PUBLICATIONS

Fu, Xinyu, Jiani Zhang, Ziqiao Meng, and Irwin King. "Magnn: Metapath aggregated graph neural network for heterogeneous graph embedding." In Proceedings of the web conference 2020, pp. 2331-2341. 2020. (Year: 2020).*

Meng, Changping, Reynold Cheng, Silviu Maniu, Pierre Senellart, and Wangda Zhang. "Discovering meta-paths in large heterogeneous information networks." In Proceedings of the 24th international conference on world wide web, pp. 754-764. 2015. (Year: 2015).*

Peng, Hao, Renyu Yang, Zheng Wang, Jianxin Li, Lifang He, S. Yu Philip, Albert Y. Zomaya, and Rajiv Ranjan. "Lime: Low-cost and incremental learning for dynamic heterogeneous information networks." IEEE Transactions on Computers 71, No. 3 (2021): 628-642. (Year: 2021).*

* cited by examiner

*Primary Examiner* — Umar Mian
(74) *Attorney, Agent, or Firm* — Michael Ye; Kalos Athena Wang PLLC

(57) ABSTRACT

A method for incremental metapath storage and dynamic maintenance is provided, which includes, reformatting metapath instances, from a designated heterogeneous graph and of a designated metapath type, into path graphs; executing graph updating tasks and performing dynamic maintenance on the updated path graphs, traversing the path graph to obtain the location of metapath updates and update the path graph; for metapaths with length greater than 2 and with symmetrical central portion, central merge operation is performed to simplify path graph and perform subsequent restoration operation; and directly perform restoration operation on path graphs that do not meet the merging conditions. The present disclosure utilizes characteristics of graph update to obtain locality of metapath updates, and combines internal relationship characteristics of metapath instances to greatly speed up metapath generation and achieve real-time inference of dynamic heterogeneous graph models.

20 Claims, 3 Drawing Sheets

METHOD AND SYSTEM FOR INCREMENTAL METAPATH STORAGE AND DYNAMIC MAINTENANCE

This application claims priority to Chinese Patent Application No. CN 202310330142.3 filed on Mar. 30, 2023, which is hereby incorporated by reference as if fully set forth herein.

BACKGROUND OF THE APPLICATION

Field

The present disclosure generally relates to acceleration of heterogeneous graph neural networks, and more particularly to a method and a system for incremental metapath storage and dynamic maintenance.

Description of Related Art

Graph data has been extensively used in various applications. Following maturity of study on homogeneous graphs, heterogeneous graphs are the emerging focus among researchers. Heterogeneous graphs can be used for emotional conversation generation, malicious account detection, spam filtering, and more fields. As compared to homogeneous graphs, heterogeneous graphs are more capable of reflecting information of vertices and edges, and thus more implemented by leading business and companies as a solution for solving problems. For example, the technology of heterogeneous graphs is used by Alibaba Group for spam filtering, and by Didi Global for user behavior prediction. As another example, thesis data providers, like DBLP, adopt different types of vertices and edges as representations of various information items, such as authors, papers, conferences, etc. Therefore, more and more models based on heterogeneous graphs have been developed, including various heterogeneous information network embedding and heterogeneous graph neural networks.

In heterogeneous graphs, there may be complex interaction among numerous types of vertices and relations, making it challenging for researchers to accurately extract different semantic information. Currently, application programs established on heterogeneous graphs mainly involve capturing multiple semantic representations in heterogeneous graphs with the assistance of metapaths that indicate various types of vertices and various relations thereamong. A metapath is a sequence of vertex types (usually denoted by $V_1V_2 \ldots V_n$), and represents a combination of the relations among plural vertices. A metapath instance is an instantiated metapath (usually denoted by $v_1v_2 \ldots v_n$). Through metapaths, semantic information and structural information in a heterogeneous graph can be effectively acquired.

To acquire semantic information and structural information from a heterogeneous graph based on metapaths, preparation includes matching metapath instances in advance, and performing metapath aggregation based on these metapath instances. The aggregation comprises intra-metapath aggregation (i.e., aggregation of structural information) and inter-metapath aggregation (i.e., aggregation of semantic information). Metapath-based graph models can usually be divided into two types. One involves use of all metapath instances, while the other involves sampling and using a part of all metapath instances. In the real world, a graph is always changing, which means that there is always addition or deletion of a vertex or an edge happening. Every time when graph changes, matching metapaths has to be conducted again for model inference, and this leads to significant model delay. This is even truer when it comes to real-time inference for dynamic heterogeneous graphs. For example, the system of Didi Chuxing performs real-time prediction of user behavior about taking taxis. In this case, serious delay can lead to frustrating user experience.

In the art known by the inventor(s), generation of metapath instances in dynamic heterogeneous graph neural networks largely relies on pre-processing. To be specific, for each type of metapaths, traversal is conducted for all vertices in a heterogeneous graph in sequence to match metapath instances. Due to sparsity and irregularity of graphs, the foregoing matching is disadvantageously time-consuming and can lead to huge delay in applications where real-time inference is required. Another known approach is about using a candidate set and making modification on the basis of existing metapath instances. However, this approach is effective only in cases where the number of graph updates is small, and as the number of graph updates increases, model accuracy can significantly decrease.

As described above, metapath-based heterogeneous graph neural networks have been extensively used, yet there are still shortcomings to address. In view of this, the present disclosure provides a method and a system for efficiently generating metapaths in a metapath-based heterogeneous graph neural network by accelerating matching metapath, which would otherwise be the most time-consuming stage in the real-time inference process of a metapath-based heterogeneous graph neural network.

Since there is certainly discrepancy between the existing art comprehended by the applicant of this patent application and that known by the patent examiners and since there are many details and disclosures disclosed in literatures and patent documents that have been referred by the applicant during creation of the present disclosure not exhaustively recited here, it is to be noted that the present disclosure shall actually include technical features of all of these existing works, and the applicant reserves the right to supplement the application with the related art more existing technical features as support according to relevant regulations.

SUMMARY

In order to address the shortcomings of the existing art about high time overheads for generation of metapath instances in heterogeneous graph neural networks, the present disclosure provides a method and a system for incremental, dynamic maintenance of metapath instances, which makes the most use of characteristics of dynamic graphs in terms of updating to significantly reduce irregular data access during generation of metapath instances, so as to achieve enhanced performance of the algorithm.

To achieve the foregoing objective, the present disclosure provides a method for incremental, dynamic maintenance of metapath instances, comprises:

reformatting metapath instances, from a designated heterogeneous graph and of a designated metapath type, into path graphs;

executing graph updating tasks, and performing the dynamic maintenance on the updated path graphs; and making triggering-condition queries on the path graphs having undergone the dynamic maintenance, wherein a merge operation is performed on the path graphs that meet triggering conditions; and a restoration operation is performed on the path graphs that do not meet the triggering conditions.

Preferably, the step of, reformatting metapath instances, from a designated heterogeneous graph and of a designated metapath type, into path graphs may comprise:

S11: in respect to an initial graph and a designated metapath type, matching the metapath instances satisfying metapath definitions; and S12: traversing the metapath instances obtained in S11 so as to reformat the metapath instances into the path graphs.

Preferably, the step of executing graph updating tasks, and performing the dynamic maintenance on the updated path graphs may comprise:

S21: determining whether types of vertices and/or edges added into or deleted from the path graphs affect the existing metapath instances, and if yes, executing a subsequent step, or if not, skipping the subsequent step;

S22: if the graph updating tasks involve deletion of the edges, traversing a set of vertices in the path graphs that are of types corresponding to the types of the edges deleted, and performing a deletion operation on the set of vertices;

S23: if the graph updating tasks involve addition of the edges, traversing a set of neighbors of a set of vertices in the path graphs that are of types corresponding to the types of the edges, so as to determine locations of vertices or edges to be added into the path graphs; or S24: if the graph updating tasks involve addition or deletion the vertices, performing an addition operation or a deletion operation for multiple said edges instead, and repeating the steps S22 and S23.

Particularly, in the step S22, if the deletion operation generates one or more independent vertices at the same time, these independent vertices have to be deleted as well.

Preferably, the step of performing the merge operation on the path graphs that meet the triggering conditions may comprise:

S31: acquiring the metapaths in all of the designated metapath types that satisfy the metapath definitions;

S32: acquiring the path graphs that correspond to the metapaths acquired in the step S31; and S33: performing the merge operation on a central portion of each of the path graphs acquired in the step S32.

Particularly, the metapaths satisfying the metapath definitions may specifically be those metapaths that have a length greater than a predetermined length (e.g., 2) and have a symmetrical central portion (e.g., a central portion in the structure of $V_iV_jV_i$). In addition, merging the central portions of the metapaths satisfying the metapath definition may be achieved by preserving only the $V_j$ portion of the $V_iV_jV_i$ structure.

Preferably, the step of performing the restoration operation on the path graphs that do not meet the triggering conditions may comprise:

S41: sequentially traversing the path graphs that have not undergone the merge operation, so as to obtain all of the metapath instances; and S42: for the path graphs that have undergone the merge operation, traversing them from the central portion thereof toward two sides thereof, so as to obtain all of the metapath instances.

Preferably, the step S11 may comprise:

S111: in respect to an initial graph and a designated metapath type, matching the metapath instances satisfying the metapath definitions in sequence beginning from a certain vertex in the initial graph;

S112: repeating the previous step S111 until the whole initial graph has been traversed and all said metapath instances have been acquired; and S113: as for the metapath instances of multiple metapath types, repeating the steps S111 and S112 until all of the metapath instances of each the designated metapath types have been acquired.

Preferably, step S12 may comprise:

S121: traversing all of the metapath instances of the metapath type acquired in S11, and reformatting the edges of each of the metapath instances into vertices for storage; and S122: as for the metapath instances of all the designated metapath types, repeating the step S121 so as to acquire the path graphs of the metapath instances of all said metapath types.

Specifically, in the step S121, if two edges in a metapath instance have connected vertices, the two reformatted vertices are connected by edges. In this way, a new storage format, namely a path graph, for all instances of that metapath type can be obtained.

Preferably, the present disclosure further involves a system for incremental metapath storage and dynamic maintenance, which may comprise:

a maintenance module, for dynamically maintaining all path graphs and sending the path graphs to a restoration module in a workload-balancing manner; and a restoration module, for performing a restoration operation on the path graphs that have been updated by the maintenance module, so as to obtain all metapath instances, and performing an aggregation operation on the metapath instances.

Preferably, maintenance module comprises one or more maintenance sub-modules, wherein the maintenance sub-module may comprise:

a graph-update receiving unit, for receiving a graph-updating instruction;

a path graph updating unit, for, in response to the graph-updating instruction, traversing the path graphs so as to update the path graphs; and a path graph sub-graph distribution unit, for sending the updated path graphs to the restoration module.

Preferably, the restoration module comprises one or more restoration sub-modules. The restoration sub-module may comprise:

a reading unit, for performing the restoration operation on the path graphs coming from the maintenance module, so as to acquire all of the metapath instances; and an aggregation unit, for performing the aggregation operation on the path graphs coming from the reading unit, so as to acquire an aggregation result of each said metapath instance.

The present disclosure provides a method and a system for accelerating matching of metapath instances in a metapath-based heterogeneous graph neural network, which store metapath instances based on path graphs so as to significantly reduce space required by storage and redundant data, and use merging to greatly decrease the frequency for vertex access and in turn random access to the memory, making generation of metapaths quite efficient. More importantly, in the existing method, generation of metapath instances and aggregation based on metapaths are performed in sequence, whereas the method of the present disclosure fuses and simultaneously performs generation of metapaths and aggregation, thereby further improving performance of the disclosed system.

DETAILED DESCRIPTION

The present disclosure will be further detailed below with reference to accompanying drawings and particular embodiments for a person skilled in the art to better understand the advantages and features of the present disclosure, thereby defining the scope of the present disclosure and eliminating indefiniteness.

Some terms used in the disclosure are first explained below.

Different from a homogeneous graph that only contains a type of vertices and a type of edges, a heterogeneous graph is of a graph data structure that is composed of multiple types of vertices and multiple types of edges, usually denoted by $G=(V, E, V_t, E_t)$, where $V$ is the set of all vertices in the graph, $E$ is the set of all edges in the graph, $V_t$ is the set graph of types of vertices in the graph, and $E_t$ is the set graph of types of edges in the graph.

A metapath is a vertex-type sequence, usually written as $V_1 V_2 \ldots V_n$, where $V_1, V_2, \ldots, V_n \in V_t$. A metapath represents a combination of relations among multiple vertices.

A metapath instance is a graph path in which all types of vertices satisfy the metapath definitions (i.e., instantiated metapaths), usually written as $v_1 v_2 \ldots v_n$, where $v_1, v_2, \ldots, v_n \in V$.

A path graph, as used in the present disclosure, is a graph formed by reformatting all metapath instances and thereby storing all of the metapath instances.

Dynamic maintenance refers to updating a path graph in a way corresponding to a graph change that has happened so as to ensure the metapath instances in the path graph are accurate.

Embodiment 1

Figure 1:
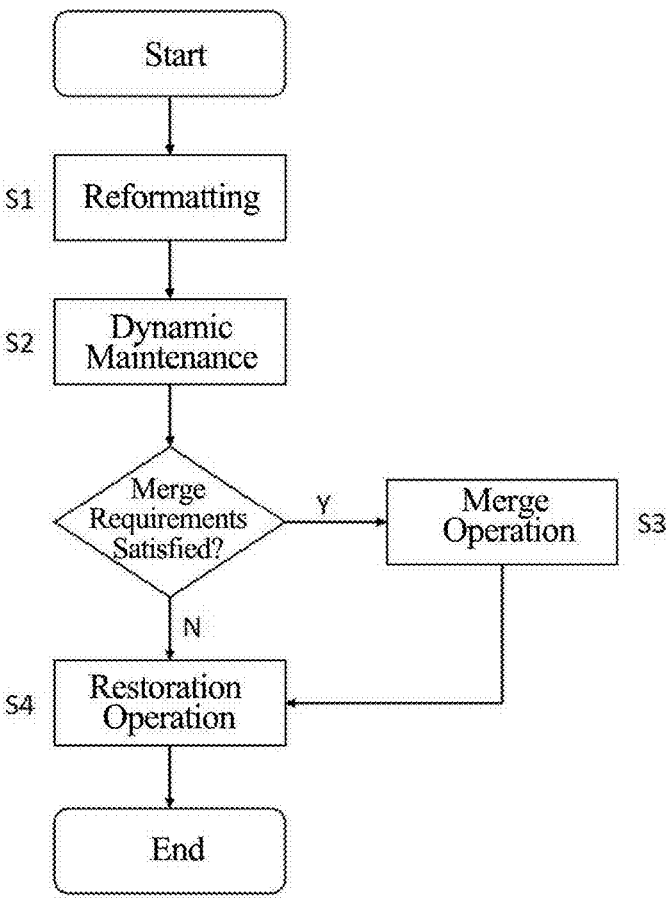
FIG. 1 is a flowchart of a method for incremental meta-path storage and dynamic maintenance according to a preferred mode of the present disclosure.

The present disclosure provides a method for incremental, dynamic maintenance of metapath instances. Referring to FIG. 1, the method may comprise the following steps;

S1: reformatting all metapath instances, from a designated heterogeneous graph and of a designated metapath type, into a new storage format (hereinafter referred to as "path graphs" for convenience);

S2: after graph updating, performing corresponding dynamic maintenance on the path graphs;

S3: a merge operation is performed on of the path graphs that meet triggering conditions; and S4: performing a restoration operation on the path graphs that do not meet triggering conditions.

According to a preferred mode, before the merge or restoration operation is performed on the path graphs that have undergone dynamic maintenance, the states of the path graphs have to be determined, which is achieved by conducting triggering-condition queries against the path graphs. Specifically, the triggering conditions may include whether the current path graph satisfies merge requirements.

Specifically, in the present disclosure, the path graphs satisfying the merge requirements are merged so as to speed up subsequent steps. Further, when inference for the model is to be performed, the path graph not satisfying the merge requirements are restored so as include all the metapath instances in computation.

According to a preferred mode, step S1 may comprise the following sub-steps:

S11: in respect to an initial graph and a designated metapath type, matching the metapath instances satisfying metapath definitions; and S12: traversing all the metapath instances obtained in the step S11, so as to construct a new storage format for metapath instances, namely path graphs.

According to a preferred mode, step S2 may comprise the following sub-steps:

S21: determining whether types of vertices and/or edges added into or deleted from the path graphs affect the existing metapath instances, and if yes, executing the subsequent step, or if not, skipping the step S2;

S22: if the graph updating tasks involve deletion of the edges, traversing a set of vertices in the path graphs that are of types corresponding to the types of the edges deleted, and performing deletion operation thereon;

S23: if the graph updating tasks involve addition of the edges, traversing a set of neighbors of a set of vertices in the path graphs that are of types corresponding to the types of the edges, so as to determine locations of vertices or edges to be added into the path graphs; or S24: if the graph updating tasks involve addition or deletion the vertices, performing an addition operation or a deletion operation for multiple said edges instead, and repeating the steps S22 and S23, thereby updating the path graphs.

Particularly, in the step S22, if the deletion operation generates one or more independent vertices at the same time, these independent vertices have to be deleted as well.

According to a preferred mode, step S3 may comprise the following sub-steps:

S31: determining the designated metapath types so as to acquire the metapaths that satisfy predetermined metapath definitions;

S32: acquiring the storage format (or path graphs) in the step S2 corresponding to the metapaths acquired in the step S31; and S33: performing the merge operation on central portions of the storage format (or path graphs) acquired in the step S2.

Particularly, in the step S31, the metapaths satisfying the predetermined metapath definitions may specifically be those metapaths that have a length greater than a predetermined length (e.g., 2) and have a symmetrical central portion. Specifically, a metapath having a symmetrical central portion may be a metapath having a central portion in the structure of $V_i V_j V_i$. It is to be noted that the foregoing metapath definitions are merely exemplary for easy understanding and explanation, and a person skilled in the art may devise definitions in other forms.

Particularly, in the step S33, the central portions in the structure of $V_i V_j V_i$ of the storage format (or path graphs) acquired in the step S32 are merged. Further, the merge operation may involve preserving only the $V_j$ portion of the $V_iV_jV_i$ structure in the central portion of the storage format (or the path graph).

According to a preferred mode, the step S4 may comprise the following sub-steps:

S41: sequentially traversing the path graphs that have not undergone the merge operation, so as to obtain all of the metapath instances; and S42: for the path graphs that have undergone the merge operation, traversing them from the central portion thereof toward two sides thereof, so as to obtain all of the metapath instances.

According to a preferred mode, the step S11 may further comprise the following sub-steps:

S111: in respect to an initial graph and a designated metapath type, matching the metapath instances satisfying the metapath definitions in sequence beginning from a certain vertex in the initial graph;

S112: repeating the step S111, until the entire initial graph has been traversed so as to obtain all of the metapath instances; and S113: as for the metapath instances of multiple designated metapath types, repeating the steps S111 and S112 until all of the metapath instances of each the designated metapath types have been acquired.

Particularly, in the step S112, the metapath instances are preferably stored in a list.

According to a preferred mode, the step S12 may further comprise the following sub-steps:

S121: traversing all of the metapath instances of the metapath type acquired in S11, and reformatting the edges of each of the metapath instances into vertices for storage; and S122: as for the metapath instances of all the designated metapath types, repeating the step S121 so as to acquire the new storage format, namely path graphs, of the metapath instances of all said metapath types.

Particularly, in the step S121, the vertices include information of the starting vertex and the target vertex related to the edge in the corresponding instance.

Further, in the step S121, if two edges in a metapath instance have connected vertices, the two reformatted vertices are connected by edges. In this way, a new storage format, namely a path graph, for all instances of that metapath type can be obtained.

For easy understanding and illustration, a specific application scene of the method for incremental metapath storage and dynamic maintenance as disclosed in the present application is described below with reference to FIG. 3 and FIG. 4.

Figure 3:
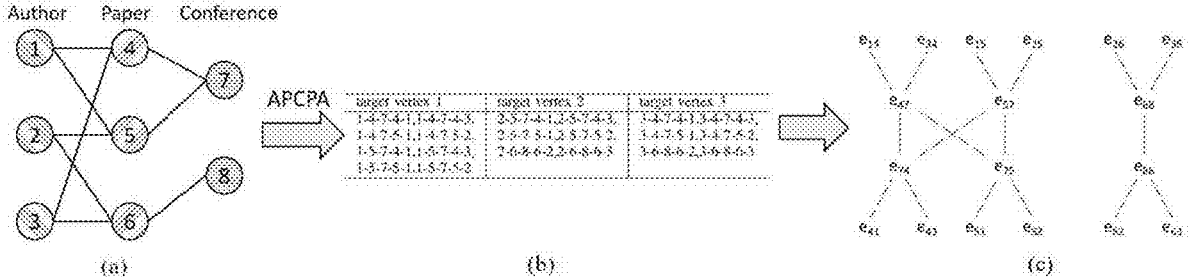
FIG. 3 illustrates a preferred application scene of a method for incremental metapath storage and dynamic maintenance according to the present disclosure.

As referred to FIG. 3, FIG. 3 (a) is a heterogeneous graph about paper citation, which contains three types of vertices, namely Author (A), Paper (P) and Conference (C), representing information of authors, papers and conferences, respectively; and two types of edges, namely A-P and P-C, representing the fact that some author wrote some paper and the fact that some paper was published in some conference. The designated metapath APCPA expresses the fact that papers written by two authors were published in the same conference. By means of the step S1, which involves traversing the initial graph, all of the metapath instances can be obtained. Further, as shown in FIG. 3 (b), the metapath instance 1-4-7-5-2 indicates that Paper 4 written by Author 1 and Paper 5 written by Author 2 were both published in Conference 7. As shown in FIG. 3 (c), then the step S2 is conducted to reformat all the metapath instances into path graphs for storage.

Figure 4:
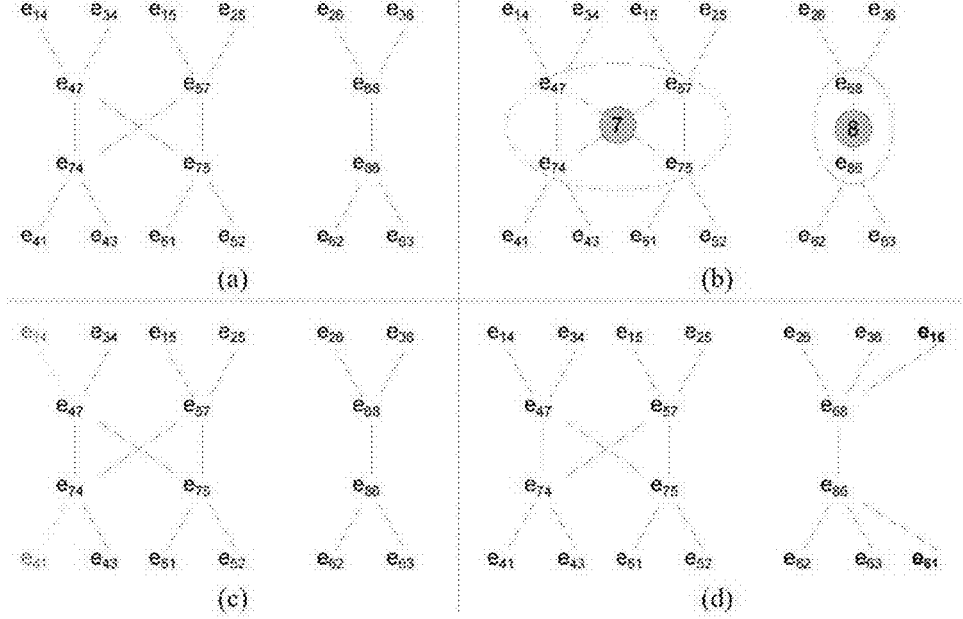
FIG. 4 illustrates the steps of merging and updating path graphs in the method for incremental metapath storage and dynamic maintenance according to the present disclosure.

FIG. 4 shows the step of merging and updating the path graphs, wherein the initial graph selected is the heterogeneous graph shown in FIG. 3 (a) and the metapath selected is APCPA. Particularly, since the metapath selected is APCPA, which satisfies the merge requirements, the path graphs in FIG. 4 (a) can be merged. The merged path graph is shown in FIG. 4 (b). Further, FIG. 4 (c) and (d) show updating results of path graphs after graph updating (including deletion of edges shown in (c) and addition of edges shown in (d)).

Embodiment 2

Figure 2:
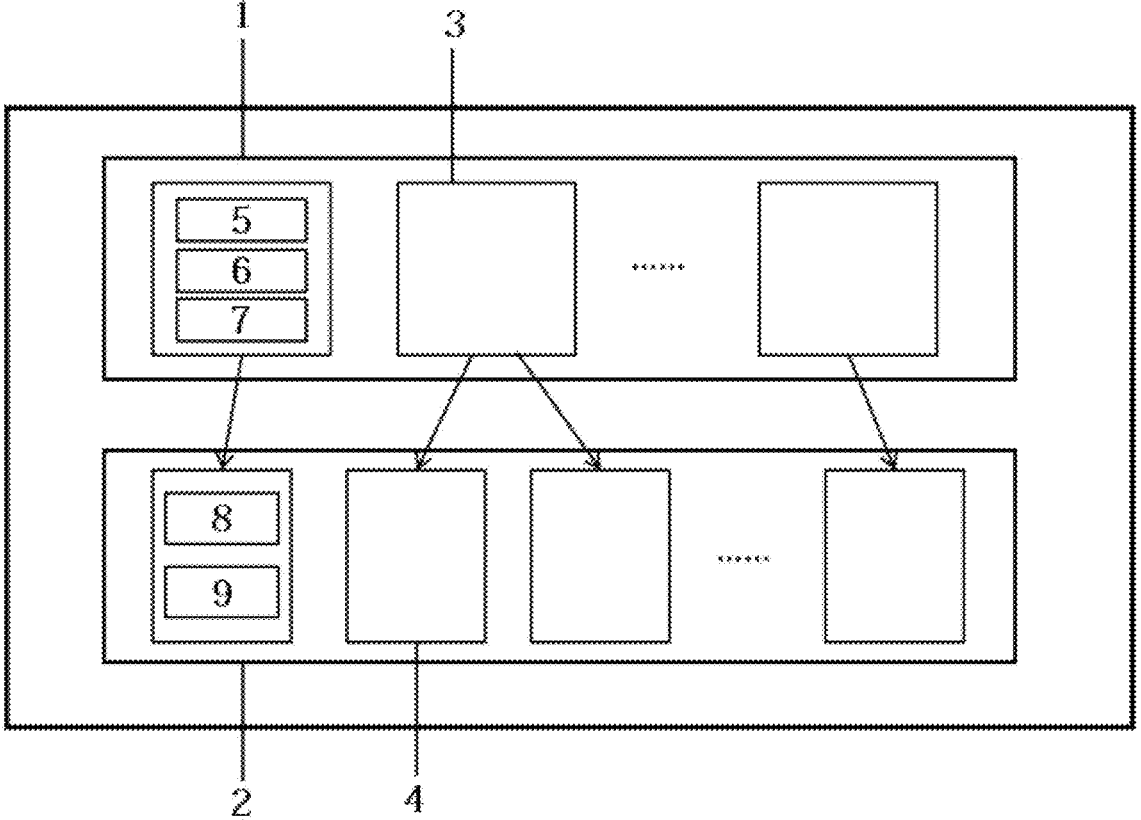
FIG. 2 is a structural block diagram of a system for incremental metapath storage and dynamic maintenance according to a preferred mode of the present disclosure.

The present disclosure provides a system for incremental dynamic maintenance of metapath instances. Referring to FIG. 2, the system may comprise a maintenance module 1 and a restoration module 2 that communicate with each other.

According to a preferred mode, the maintenance module 1 dynamically maintains all the path graphs and sends the path graphs to the restoration module 2 in a workload-balancing manner. The restoration module 2, after the maintenance module 1 updates the path graphs, performs the restoration operation on the updated path graphs, so as to obtain all of the metapath instances, and performs the aggregation operation on the basis of the metapath instances.

Specifically, the updating information of the path graph may include addition or deletion of edges or vertices. Particularly, addition or deletion of vertices may be regarded as addition or deletion of multiple edges. Further, after the path graphs are updated, the path graphs are distributed to the restoration module in the form of connected components.

According to a preferred mode, referring to FIG. 2, the maintenance module 1 may comprise one or more maintenance sub-modules 3. Specifically, the maintenance sub-module 3 may be used to update one or more path graphs.

Further, maintenance sub-module 3 may comprise graph-update receiving unit 5, path graph updating unit 6 and/or path graph sub-graph distribution unit 7. Specifically, the graph-update receiving unit 5 is for receiving instructions about graph updating. The path graph updating unit 6 is for, in response to the received graph-updating instruction, traversing the path graphs so as to complete updating of the path graphs. The path graph sub-graph distribution unit 7 is for sending the updated path graphs to the restoration module 2.

According to a preferred mode, referring to FIG. 2, the restoration module 2 may comprise one or more restoration sub-modules 4. Specifically, the restoration sub-module 4 is for reading the metapath instances from the path graphs and performing the aggregation operation.

Further, the restoration sub-module 4 may comprise a reading unit 8 and/or an aggregation unit 9. Specifically, the reading unit 8 performs the restoration operation on the path graphs coming from the maintenance module 1, so as to acquire all said metapath instances. In other words, the reading unit 8, after receiving the path graphs from the maintenance module 1, traverses the path graphs so as to obtain all of the metapath instances, and sends the metapath instances to the aggregation unit 9. The aggregation unit 9 performs the aggregation operation on the metapath instances coming from the reading unit 8, thereby acquiring the aggregation result of every metapath instance. Particularly, the aggregation result output by the aggregation unit 9 may be used in subsequent computing for model inference.

According to a preferred mode, in the present disclosure, the reading unit 8 and the aggregation unit 9 may be activated synchronously or in parallel. Specifically, every time the reading unit 8 obtains a metapath instance, it sends the corresponding result to the aggregation unit 9 so that the aggregation unit 9 can include the metapath instance in its computation for aggregation. This significantly enhances parallelism and computing efficiency of the system.

Particularly, the data to be processed by a processor loaded with the disclosed method for metapath storage and dynamic maintenance may specifically be heterogeneous graphs in real-world scenes, such as paper data sets, internet movie data sets, etc. These data sets are heterogeneous graph data sets, containing multiple types of vertices or edges. During application, the processor (such as a CPU) retrieves and read the to-be-processed data from the hard drive and performs the intra-metapath aggregation operation, so as to complete a part of the inference computing work for the heterogeneous graph neural network. After the processor (e.g., the CPU) processes the data, the data are sent to the graph processing unit (GPU) through a PCIe bus to enable subsequent inference computing work for the heterogeneous graph neural network.

A person skilled in the art would appreciate that without conflicting the objective of the present disclosure, the disclosed method may include other steps or operations before, after or between any of the steps a, b and/or S1-S3, in order to, for example, further optimize and/or improve the disclosed method. Moreover, while the disclosed method has been exhibited and described as a series of movements performed in sequence, the method is not limited to the described sequence. For example, some of the movements may happen in a sequence different from that described herein. Alternatively, one movement may happen simultaneously with another movement.

A person skilled in the art would also appreciate that various exemplary implementations of the present disclosure may be realized using software, or may be realized using software in combination with necessary hardware. As such, implementations of according to the present disclosure may be in the form of a software product. The software product may be stored in a non-volatile storage medium or a non-transitory computer-readable storage medium (which may be a CD-ROM, a USB flash drive, or a portable hard drive) or in a cloud, and comprises several instructions that instruct a computing device (e.g., a personal computer, a server, a mobile terminal, or a network device) to execute the method of the present disclosure.

In an exemplary implementation, the program product of the present disclosure may be any combination of one or more readable media. The readable media may be readable signal media or readable storage media. Examples of the readable storage media include but are not limited to electric, magnetic, optical, electromagnetic, infrared or semiconductor systems, devices or apparatus, or any combination thereof. More specific examples of the readable storage media include but are not limited to electric connection having one or more leads, portable disks, hard drives, random-access memory (RAM), read-only memory (ROM), erasable programmable read-only memory (EPROM or flash memory), optical fibers, portable compact disc read-only memory (CD-ROM), optical disks, magnetic disks, or any combination thereof.

Correspondingly, based on the inventive concept as described previously, the present disclosure further provides an electronic device.

In an exemplary implementation, the electronic device is in the form of a general-purpose computing device. The electronic device may comprise components such as at least one processor, at least one storage device, and a bus for connecting system components (including the storage device and the processor).

Therein, the storage device stores program codes. The program codes may be executed by the processing unit, so that the processing unit executes the method of the present disclosure. The processor at least comprises the data processing unit (also referred to as "modules") as provided in the present disclosure. The storage device may include a readable medium in the form of a volatile storage unit, such as a random-access memory (RAM) and/or a cache unit, and may further include a read-only memory (ROM).

In the present disclosure, the storage device further may comprise a program/utility tool having a set of at least one program module. Examples of such a program module include but are not limited to: an operation system, one or more applications, other program modules and program data. Every one or a certain combination of these examples may include implementation of a network environment.

Herein, the bus may be realized as one or more different types of buses, including storage device buses or storage device controllers, peripheral buses, graph acceleration ports, processing units or local buses of any bus structure among multiple bus structures.

The electronic device may communicate with one or more external devices (e.g., a keyboard, a pointing device, a Bluetooth device, etc.), and/or may further communicate with one or more devices that enable a user to interact with the electronic device, and/or may communicate with any other devices allowing the electronic device to communicate with one or more other computing devices, e.g. a router, modulator-demodulator, etc.

Such communication may be conducted through an input/output (I/O) interface. In addition, the electronic device may further communicate with one or more networks (e.g., LANs, WANs, and/or public networks, such as the Internet) through a network adapter. The network adapter communicates with other modules of the electronic device through a bus. It is to be noted that, although this is not expressed in this disclosure, other hardware and/or software modules may be used in combination with the electronic device. Examples of such hardware and/or software modules include but are not limited to micro codes, device drivers, redundant processing units, external disk driver arrays, RAID systems, tape drivers, and data backup storage systems, etc.

It is to be noted that the particular embodiments described previously are exemplary. People skilled in the art, with inspiration from the disclosure of the present disclosure, would be able to devise various solutions, and all these solutions shall be regarded as a part of the disclosure and protected by the present disclosure. Further, people skilled in the art would appreciate that the descriptions and accompanying drawings provided herein are illustrative and form no limitation to any of the appended claims. The scope of the present disclosure is defined by the appended claims and equivalents thereof. The disclosure provided herein contains various inventive concepts, such of those described in sections led by terms or phrases like "preferably", "according to one preferred mode" or "optionally". Each of the inventive concepts represents an independent conception and the applicant reserves the right to file one or more divisional applications therefor.

What is claimed is:

1. A method performed by a computing system comprising a processor and memory for reducing data access during real-time inference of a heterogeneous graph neural network by utilizing incremental metapath storage and dynamic maintenance, the method comprising the steps of:

reformatting metapath instances, from a designated heterogeneous graph and of a designated metapath type, into path graphs;

executing graph updating tasks and performing the dynamic maintenance on the path graphs; and making triggering-condition queries on the path graphs having undergone the dynamic maintenance, wherein the step of making triggering-condition queries comprises the substeps of:

performing a merge operation on path graphs that meet triggering conditions; and performing a restoration operation on path graphs that do not meet the triggering conditions;

storing the path graphs on one or more readable storage media selected from the group comprising electric connection having one or more leads, portable disks, hard drives, random-access memory (RAM), read-only memory (ROM), erasable programmable read-only memory (EPROM or flash memory), optical fibers, portable compact disc read-only memory (CD-ROM), optical disks, magnetic disks, or any combination thereof, wherein the computing system receives changes to the designated heterogenous graph, wherein the changes comprise insertions of new vertices or new edges and/or deletions of vertices or edges, wherein the computer system incrementally maintains stored path graphs based on the received changes and reduces data access during real-time inference of a heterogenous graph neural network by utilizing the stored path graphs.

2. The method of claim 1, wherein the step of reformatting metapath instances, from a designated heterogeneous graph and of a designated metapath type, into path graphs comprises the substeps of:

in respect to the designated heterogeneous graph and the designated metapath type, matching the metapath instances satisfying metapath definitions; and traversing the metapath instances so as to reformat the metapath instances into the path graphs.

3. The method of claim 2, wherein the step of executing graph updating tasks and performing the dynamic maintenance on the path graphs comprises the substeps of:

determining whether types of vertices and/or edges added into or deleted from the path graphs affect the existing metapath instances, and if yes, executing a subsequent substep, or if not, skipping the subsequent substeps;

if the graph updating tasks involve deletion of the edges, traversing a set of vertices in the path graphs that are of types corresponding to the types of the edges deleted, and performing a deletion operation on the set of vertices;

if the graph updating tasks involve addition of the edges, traversing a set of neighbors of a set of vertices in the path graphs that are of types corresponding to the types of the edges, so as to determine locations of vertices or edges to be added into the path graphs; or if the graph updating tasks involve addition or deletion the vertices, performing an addition operation or a deletion operation for multiple said edges instead, and repeating the step for graph updating tasks involving deletion of the edges or graph updating tasks involving addition of the edges.

4. The method of claim 2, wherein the substep of, in respect to the designated heterogenous graph and the designated metapath type, matching the metapath instances satisfying the metapath definitions comprises the substeps of:

in respect to the designated heterogenous graph and the designated metapath type, matching the metapath instances satisfying the metapath definitions in sequence beginning from a certain vertex in the designated heterogenous graph;

repeating the previous substep until the designated heterogenous graph has been traversed and all said metapath instances have been acquired; and as for metapath instances of multiple metapath types, repeating the previous substeps until all of the metapath instances of each the designated metapath types have been acquired.

5. The method of claim 2, wherein the substep of traversing the metapath instances so as to reformat the metapath instances into the path graphs comprises:

traversing all of the metapath instances of the designated metapath type, and reformatting the edges of each of the metapath instances into vertices for storage; and as for all the metapath types existing in the initial graph, repeating the previous step so as to acquire the path graphs of the metapath instances of all said metapath types.

6. The method of claim 5, wherein the vertices include information of a starting vertex and a target vertex related to the edge in the corresponding instance.

7. The method of claim 5, wherein if two edges in a metapath instance have connected vertices, the two reformatted vertices are connected by edges.

8. The method of claim 1, wherein the substep of performing a merge operation on the path graphs that meet the triggering conditions comprises the substeps of:

acquiring metapaths in all of the designated metapath types that satisfy the metapath definitions;

acquiring path graphs that correspond to the metapaths that satisfy the metapath definitions; and performing the merge operation on a central portion of each of the path graphs.

9. The method of claim 8, wherein the metapaths that satisfy the metapath definitions are those metapaths that have a length greater than a predetermined length and have a symmetrical central portion.

10. The method of claim 1, wherein the substep of performing a restoration operation on the path graphs that do not meet the triggering conditions comprises the substeps of:

sequentially traversing path graphs that have not undergone the merge operation, so as to obtain all of the metapath instances; and traversing path graphs that have undergone the merge operation from the central portion thereof toward two sides thereof, so as to obtain all of the metapath instances.

11. A system for reducing data access during real-time inference of a heterogeneous graph neural network by utilizing incremental metapath storage and dynamic maintenance, wherein the system comprises:

a processor coupled to a memory;

a maintenance module, for dynamically maintaining path graphs and sending the path graphs to a restoration module in a workload-balancing manner;

the restoration module, for performing a restoration operation on the path graphs that have been updated by the maintenance module, so as to obtain all metapath instances, and performing an aggregation operation on the metapath instances;

one or more readable storage media, for storing the path graphs, selected from the group comprising electric connection having one or more leads, portable disks, hard drives, random-access memory (RAM), read-only memory (ROM), erasable programmable read-only memory (EPROM or flash memory), optical fibers, portable compact disc read-only memory (CD-ROM), optical disks, magnetic disks, or any combination thereof; and wherein the system receives changes to the designated heterogenous graph, wherein the changes comprise insertions of new vertices or new edges and/or deletions of vertices or edges; wherein the computer system incrementally maintains the stored path graphs based on the received changes and reduces data access during real-time inference of a heterogenous graph neural network by utilizing the stored path graphs.

12. The system of claim 11, wherein the maintenance module comprises one or more maintenance sub-modules, wherein each of the maintenance sub-modules comprises:

a graph-update receiving unit, for receiving a graph-updating instruction;

a path graph updating unit, for, in response to the graph-updating instruction, traversing the path graphs so as to update the path graphs; and a path graph sub-graph distribution unit, for sending the updated path graphs to the restoration module.

13. The system of claim 12, wherein the restoration module comprises one or more restoration sub-modules, wherein each of the restoration sub-modules comprises:

a reading unit, for performing the restoration operation on the path graphs coming from the maintenance module, so as to acquire all of the metapath instances; and an aggregation unit, for performing the aggregation operation on the path graphs coming from the reading unit, so as to acquire an aggregation result of each said metapath instance.

14. The system of claim 13, wherein the system is configured for acquiring metapaths in all of the designated metapath types that satisfy metapath definitions;

acquiring path graphs that correspond to the metapaths that satisfy the metapath definitions; and performing a merge operation on a central portion of each of the path graphs.

15. The system of claim 14, wherein the system is configured for sequentially traversing path graphs that have not undergone the merge operation, so as to obtain all of the metapath instances; and for path graphs that have undergone the merge operation, traversing them from the central portion thereof toward two sides thereof, so as to obtain all of the metapath instances.

16. The system of claim 15, wherein the system is configured for in respect to an initial graph and a designated metapath type, matching metapath instances satisfying the metapath definitions in sequence beginning from a certain vertex in the initial graph;

repeating the previous step until the whole initial graph has been traversed and all said metapath instances have been acquired; and as for the metapath instances of multiple metapath types, repeating the previous steps until all of the metapath instances of each the designated metapath types have been acquired.

17. The system of claim 16, wherein the system is configured for traversing all metapath instances of the designated metapath type, and reformatting edges of each of the traversed metapath instances into vertices for storage; and as for all metapath types existing in the initial graph, repeating the previous step so as to acquire path graphs of the metapath instances of all said metapath types.

18. The system of claim 17, wherein the metapaths satisfying the metapath definitions are those metapaths that have a length greater than a predetermined length and have a symmetrical central portion.

19. The system of claim 18, wherein the vertices include information of a starting vertex and a target vertex related to the edge in the corresponding instance.

20. The system of claim 19, wherein if two edges in a metapath instance have connected vertices, the two reformatted vertices are connected by edges.

* * * * *